United States Patent

Rauhala et al.

Patent Number: 5,914,960
Date of Patent: Jun. 22, 1999

[54] METHOD TO ACCOMPLISH A PACKET-FORM CONNECTION

[75] Inventors: Kristian Rauhala, Espoo; Pekka Soininen, Helsinki, both of Finland

[73] Assignee: Nokia Telecommunications OY, Espoo, Finland

[21] Appl. No.: 08/789,209

[22] Filed: Jan. 24, 1997

[30] Foreign Application Priority Data

Jan. 26, 1996 [FI] Finland .................................. 960382

[51] Int. Cl.$^6$ ....................................... H04J 3/24
[52] U.S. Cl. .................... 370/468; 370/473; 395/877
[58] Field of Search ..................... 370/465, 468, 370/470, 477, 506, 528, 232, 235, 60; 395/872, 873, 877

[56] References Cited

U.S. PATENT DOCUMENTS

| | | | |
|---|---|---|---|
| 5,282,203 | 1/1994 | Oouchi | 370/232 |
| 5,381,408 | 1/1995 | Brent et al. | 370/60 |
| 5,493,566 | 2/1996 | Ljungberg et al. | 370/235 |
| 5,566,208 | 10/1996 | Balakrishnan | 370/528 |
| 5,644,577 | 7/1997 | Christense et al. | 370/506 |
| 5,663,962 | 9/1997 | Caire et al. | 370/535 |

FOREIGN PATENT DOCUMENTS

| | | |
|---|---|---|
| 0363499 | 4/1990 | European Pat. Off. . |
| 0365693 | 5/1990 | European Pat. Off. . |
| 0528085 | 2/1993 | European Pat. Off. . |
| 0664630 | 7/1995 | European Pat. Off. . |
| WO 95/34977 | 12/1995 | WIPO . |

*Primary Examiner*—Chi H. Pham
*Assistant Examiner*—Frank Duong
*Attorney, Agent, or Firm*—Pillsbury Madison & Sutro LLP

[57] ABSTRACT

A method of implementing a packet-form data connection, in which a bit stream is generated at a transmitting end, data packets are formed from the bit stream, the data packets formed are sent through a packet network to a receiving end, at least the bits of the data packets belonging to the payload are conducted to a receiving buffer at the receiving end, and the data stored in the receiving buffer is read out. To eliminate any problems caused by packaging delay, the fullness degree of the packets is temporarily reduced at the beginning of a connection, so as to reduce perceptive effect of the packaging delay.

7 Claims, 2 Drawing Sheets

METHOD TO ACCOMPLISH A PACKET-FORM CONNECTION

BACKGROUND OF THE INVENTION

The invention relates to a method to the preamble of attached for implementing a packet-form telecommunication connection.

In principle, the method of the invention can be applied in any packet switched telecommunication network in which an individual data packet has a certain minimum size, but the invention, however, is primarily intended for an ATM network (Asynchronous Transfer Mode), in which a data packet has a certain standard size.

As previously known, ATM is a new connection-oriented packet switching technique, in which the problems of conventional packet networks have been solved by proceeding to use short packets of standard length (53 bytes), known as cells. Each cell consists of a 48-byte payload part and a 5-byte heading. The ATM technique, however, will not be described in greater detail herein, since the method of the invention does not require any solutions specific for the ATM technique.

Packaging of a packet—e.g. an ATM cell—for sending in a packet network causes a certain delay; the delay naturally being the greater, the slower is the bit stream from which the packets are formed.

The packaging delay may thus become even too long for time; critical applications with a slow bit rate. For example, an acceptable delay for speech encoded by a speech codec to a rate of 8 kbit/s is about 25 ms at both ends of the connection (M. J., McTiffin et al., IEEE Journal on Selected Areas in Communications, 12,900, (1994)). Filling of a single ATM cell at this rate, however, causes a delay of about 48 ms. The delay is problematic especially in situations where the persons talking take turns. For example, if subscriber A asks a question from subscriber B, it first takes 48 ms until an ATM cell is filled, and then another 48 ms at the opposite end before the response given by subscriber B is sent back. The two-way packaging delay alone is thus about 0.1 s, which is very irritating to subscriber A (since he or she wonders why subscriber B is not responding to the question asked).

The above described delay problem is solved in ATM networks by filling the cells only in part. For example, if the payload part of the cells is filled only in half with an actual payload signal, the packaging delay in the above provided example is 24 ms, which is acceptable. The drawback of such a solution, however, is that some of the transmission capacity of the network is wasted.

Another previously used way of reducing the packaging delay is to multiplex several slow bit streams into one and the same ATM cell. When a solution like this is used, these different 'mini cells' have to be demultiplexed from the ATM cell in the ATM network, whereby many of the advantages offered by the standard ATM technique based on fixed cell size are lost. Another drawback of the multiplexing solution is that it requires permanent allocation of channels to traffic sources, independently of whether or not data is transmitted.

A packaging delay may sometimes also delay the delivery of e.g., control or supervision information too long. Above all, this may happen in situations where alarm type information has to be transmitted via the packet network to a receiving end. Problems caused by packaging delay may thus also relate to control information transmitted in the network as well as to subscriber data.

SUMMARY OF THE INVENTION

The object of the present information is to provide a method for controlling packaging delay, avoiding the above mentioned drawbacks.

The idea of the invention is that the degree of fullness of the packets sent during a connection is temporarily changed from one value to another, so that any momentary drawbacks caused by a packaging delay can be eliminated. (The degree of fullness here refers to that part of the whole payload part of the packet which is taken up by payload bits (user data or control information transmitted in the network). A packet is thus incompletely filled when only part of the payload part is filled with a payload signal.) In the case of speech, for example, the following of the above principle means that at the beginning of a bit stream, packets (or cells) filled only in part are sent and that the fullness degree of the packets is raised such that it reaches the maximum within a certain predefined time. In the case of control or supervision information, on the other hand, it may be necessary to reduce the fullness degree of the packets temporarily for a short time, so that information can be delivered to a receiving end even more quickly. The fullness degree (function followed by the fullness degree) may change in many different ways.

At the receiving end, data can be read from a buffer in various ways, depending on the type of application used and the protocol followed at the transmitting end. For example, if the degree of fullness is slowly raised at the transmitting end until it reaches the maximum, it is preferable to raise the reading rate at the receiving end to its normal value within a certain predefined period of time so as to guarantee a continuous data stream at the receiving end.

The solution of the invention makes it possible to spread—e.g. in the case of speech—a packaging delay over a certain (short) predefined period of time, whereby any drawbacks caused by it can be eliminated.

On the other hand, a method of the invention also makes it possible to utilize the transmission capacity effectively, since after the (short) period of time, it is possible to utilize the transmission capacity to the full. Further, the invention does not bring about any changes that would not enable utilization of the standard ATM technique. In other words, a standardized ATM connection can be used on all levels.

A method of the invention also enables elimination of random delays occurring in the packet network. For example, if the total delay approaches the maximum allowed value, it can be reduced by reducing the packaging delay (i.e. by temporarily reducing the degree of fullness).

BRIEF DESCRIPTION OF THE DRAWINGS

In the following, the invention and its preferred embodiments will be described in greater detail with reference to the examples of the attached drawings, in which.

DETAILED DESCRIPTION

Figure 1:
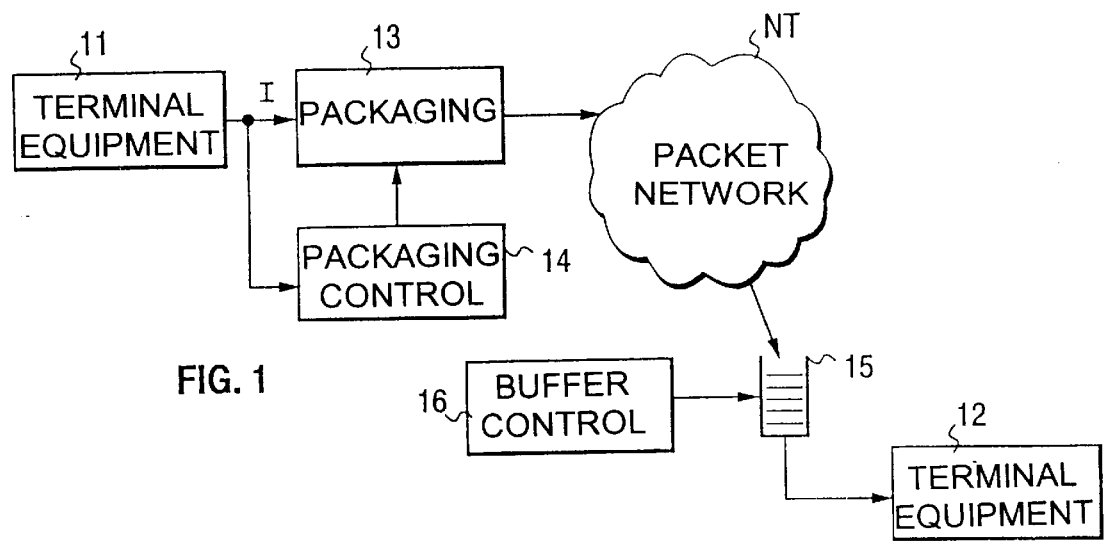
FIG. 1 shows a transmission system in which a method provided by the invention is used.

FIG. 1 is a general block diagram illustrating a data link connection between two terminal equipments in which a method provided by the invention is provided used. Below is a more detailed description of an embodiment in which the terminal equipments send encoded speech.

Terminal equipments 11 and 12 communicate with each other via a packet network NT. The terminal equipments can be, e.g., phones containing a speech codec (e.g., mobile phones whose signals are transmitted via a fixed network). A bit stream I (with a rate of e.g. 8 kbit/s) generated by the speech codec of terminal equipment 11 is supplied to a packaging unit 13, which forms data packets, such as ATM cells, of an incoming bit stream. The actual formation (packaging) of data packets is conducted in a manner known per se. In the invention, the packaging unit 13 is controlled by a separate control unit 14, the operation of which will be described below. Ready-made data packets are sent from the packing unit 13 through the packet network NT to the receiving end, where they are supplied to a receiving buffer 15.

The measures taken at the receiving end in the invention are the following: incompletely filled data packets are formed at the beginning of a bit stream, and the degree of fullness is raised from a certain initial value to the maximum value within a certain predefined period of time T1. If the instances of transmission of the packets sent by the packaging unit are indicated by $t_k$, the number of (payload) bits sent in a packet is $N_k = i \times (t_k - t_{k-1})$, where i is the rate of an incoming bit stream I and $t_{k-1}$ is the instance of transmission of the preceding data packet. To raise the fullness degree of a packet from a certain initial value to a maximum value within a certain period of time T1 thus means that the control unit 14 gradually lengthens the transmission interval between two consecutive packets during the period T1 (i is here assumed to be essentially constant).

The $N_k$ bits arriving at the receiving end in the packet are received after a certain transmission delay, which is typically much shorter than the packaging delay. In the receiving buffer 15 (FIFO), bits are read out at a rate o. To prevent the buffer from emptying before the arrival of a next packet at a moment $t_{k+1}$ (and, on the other hand, an overflow of the buffer), it must hold true for reading rate o that $N_k = o \times (t_{k+1} - t_k)$. On the basis of the above, the reading rate can thus be represented by the formula:

$$o = i \times \frac{t_k - t_{k-1}}{t_{k+1} - t_k} \quad (1)$$

This is thus the condition for that the receiving buffer 15 always contains data to be read. The ratio o/i defines the relative distortion of rate at the receiving end.

Figure 2:
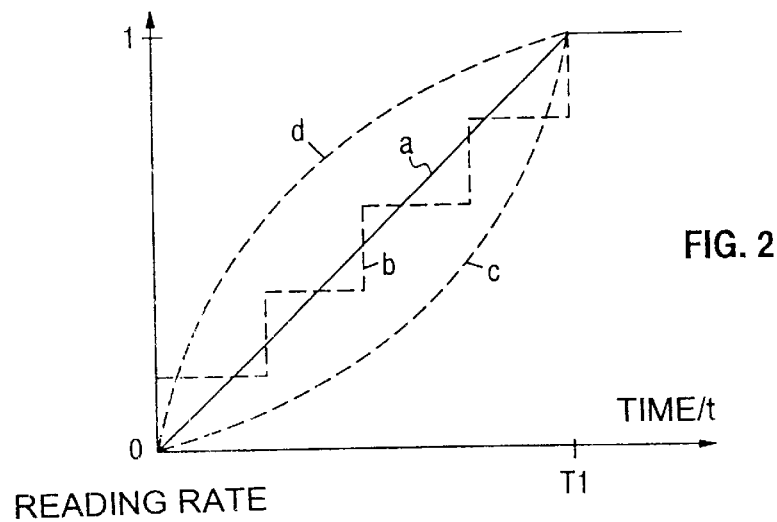
FIG. 2 illustrates the operation of a method provided by the invention at the transmitting end of the system according to FIG. 1.

FIG. 2 illustrates operation of a control unit 14 controlling a packaging process. The vertical axis in the figure represents the fullness degree of a packet, e.g. an ATM cell, and the horizontal axis, time. The figure illustrates four different alternatives (a to d) for raising the degree of fullness. At the beginning of a bit stream I, i.e. at a time instance t=0, the fullness degree has the value zero or some other value that is clearly below one, whereas after a time instance t=T1, it has the value one. The function followed by the fullness degree between these values depends on the application used. Alternative a represents a situation where the fullness degree grows linearly from the initial value zero to the maximum value. Alternative b, in turn, represents a situation where the fullness degree grows stepwise to the maximum value. Alternatives c and d represent two exponential growth curves. The control unit 14 thus controls the transmission instances $t_k$ of the packets so that the fullness degree changes in a desired way. In alternative a, for example, the transmission moment $t_k$ could be defined as:

$$t_k = t_{k-1} + k \times t_b \quad (2)$$

where $t_b$ stands for the duration of one bit and k is an integer whose value grows packet by packet during a time period T1. With ATM cells, for example, k would grow from 1 to 384 (the payload part of a cell comprises 384 bits in all), i.e. during the time period T1 each cell would always have one (payload) bit more than the preceding cell.

The length of the time period T1 depends on the application used, but its value is preferably at least one decade higher than that of the packaging delay. In the above example in which the packaging delay is 48 ms, the length of the time period T1 should be of the order of at least half a second.

The method of the invention thus operates, e.g. in a telephone conversation between two subscribers, such that at the beginning of each sentence (i.e., bit stream), incompletely filled packets/cells are sent. Since sentences typically last several seconds, the fullness degree will reach the maximum value at the beginning of a sentence so that most of the sentence is then transmitted by full cells. If there is a pause (no speech) in the bit stream, the procedure will be re-started as the subscriber starts to speak again. From the bit stream I (or lack thereof), the control unit thus learns when the degree of fullness has to be dropped to an initial value for a new period T1.

Figure 3:
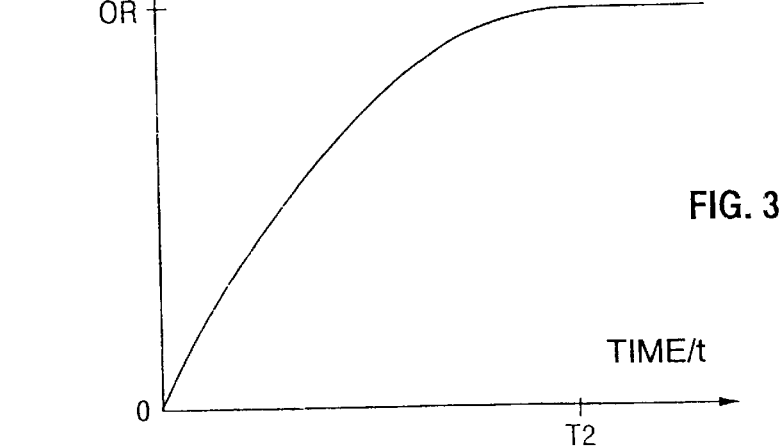
FIG. 3 illustrates the operation of a method provided by the invention at the receiving end of the system according to FIG. 1.

FIG. 3 illustrates operation of a control unit 16 of a buffer. The vertical axis represents the reading rate at which data is read from the buffer, and the horizontal axis, time. At the beginning of a bit stream (at time instance t=0), the reading rate typically has a certain initial value, such as zero, and after a certain period of time T2, the reading rate reaches the maximum, indicated by OR. Ideally, the lengths of the time periods T1 and T2 are equal; in other words the reading rate reaches the maximum simultaneously as the fullness degree of the packets reaches the maximum, but the lengths of the time periods may also differ from each other, especially when internal delays are generated in the packet network NT. (Adjustment of the reading rate can thus also be used for compensating for random delays in the packet network.)

On the basis of the above formulae (1) and (2), the following equation is obtained, for example, for the reading rate o, which corresponds to situation a in FIG. 2:

$$o = [k/(k+1)] \times i.$$

In an ATM cell, for example, the ratio o/i (i.e. relative distortion of rate) would thus be reduced from ½ to 384/385 during a period T2.

The best way of collecting bits in cells at the transmitting end and reading bits from the receiving buffer 15 depend on the type of terminal equipments (and data transmission protocol) used. For example, a speech codec typically requires a bit block of a certain length (e.g. 10 bits) at the input before it can start decoding. In cases like these, it is thus preferable to perform a reading operation immediately as a new bit block is received. The buffer control unit 16 can thus monitor the fullness degree of the buffer and read the contents of the buffer immediately as a number of bits have been received that corresponds to the size of the block. In a speech codec like this, it is preferable to collect a number of bits corresponding to the block size even in the first packet at the transmitting end. The fullness degree thus has a value other than zero even at a time instance t=0.

There are also codecs that can start decoding at the very beginning of a block, i.e. without it being necessary to wait that an entire bit block has been received.

The parameters used on a connection (e.g. length of the time periods T1 and T2) can be determined as the connection is being established, or the parameters can remain constant from one connection to another. In principle, it is also possible to change the parameters in the middle of an active connection.

The method of the invention was described above in the case of encoded speech. As stated above, the above type of adjustment of the reading rate in the time period T2 ensures that no underflow of the receiving buffer occurs. If, however, the application used is such that a possible underflow is not harmful, it is not absolutely necessary to adjust the reading rate at all.

Figure 4:
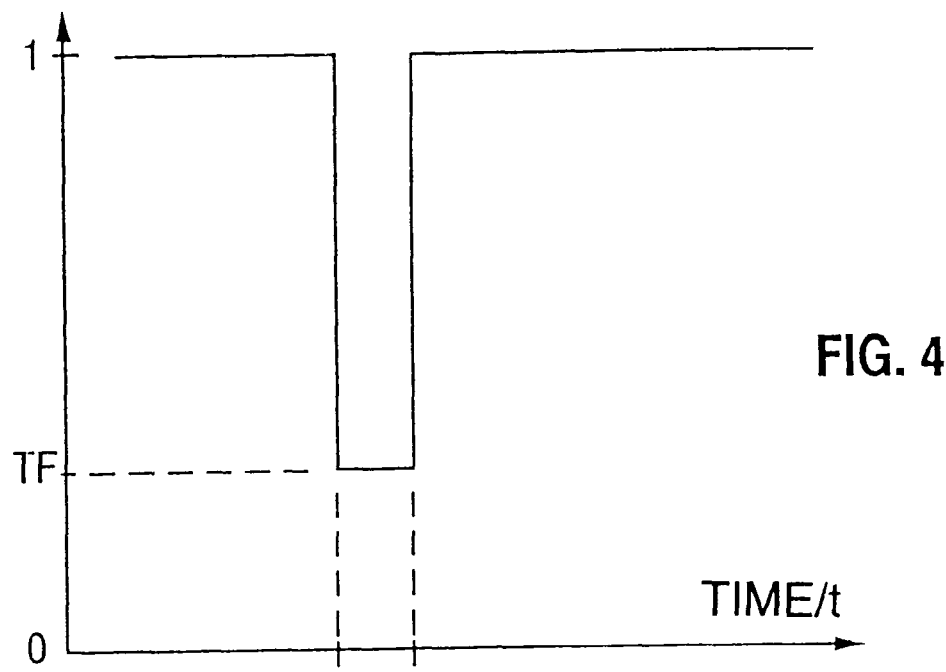
FIG. 4 illustrates an alternative embodiment of the invention.

The above examples illustrate the problems that too long a packaging delay causes to actual payload data. In some (special) cases, a packaging delay may cause an unduly long delay even to control information transmitted. The principle of the invention can thus also be used for expediting delivery of such information such that the fullness degree of the packets is temporarily dropped in the packaging unit 13. A case like that is illustrated in FIG. 4, in which the fullness degree is dropped stepwise from a normal value (one) to a temporary value TF. Information indicating that the fullness degree needs to be changed can be obtained, for example, as control information sent by the packet network (for example, packet network sends information about a rush, which makes it necessary to expedite delivery of control information). The adjustment according to FIG. 4 can also be used in the case of data-carrying packets, e.g. if the total delay comes close to the maximum value allowed. The total delay can then be reduced by temporarily reducing the fullness degree of the packets. Information about the growth of the total delay can be obtained, for example, from the opposite end, in which e.g., reduction of the fullness degree of the receiving buffer to below the allowed limit triggers transmission of a notification to the opposite end.

Although the invention is described above with reference to the examples illustrated in the attached drawings, it is to be understood that the invention is not limited thereto but can be modified within the scope of the inventive idea presented above and in the attached claims. For example, the rate i of an incoming bit stream I can vary more generally than stepwise with respect to time, which makes adjustment of the reading rate more complicated. As also appears from the above, a detailed implementation of the method will greatly depend on the type of the transmitter and receiver (application used) and on how they co-operate (protocol used). As appears from the above, a method of the invention can be used in many different types of environments, and in connection with both a fixed network and a mobile network.

We claim:

1. A method of implementing a packet-form data connection, comprising:

generating a bit stream at a transmitting end;

forming data packets from the bit stream such that the packets contain a payload of bits of data from the bit stream, including temporarily adjusting the degree of the packets during a connection fullness such as to control packaging delay so that at the beginning of the bit stream, incompletely filled data packets are formed, and the fullness degree of the data packets is raised from an initial value to a maximum value during the connection;

transmitting said data packets through a packet network to a receiving end;

directing at least the bits belonging to the payload of the data packets to a receiving buffer at the receiving end to thereby store data in the receiving buffer; and reading the data stored in the receiving buffer.

2. The method according to claim 1, wherein:

said temporarily adjusting includes raising the fullness degree of the data packets from the initial value to the maximum value within a certain period of time having a predefined length.

3. The method according to claim 1, wherein:

said reading from said receiving buffer includes controlling the reading rate such that the reading rate is raised from a predefined initial value, which it has at the beginning of the bit stream, to a normal value, within a period of time having a predetermined length.

4. The method according to claim 1, wherein:

said temporarily adjusting includes raising the fullness degree of the data packets from the initial value to the maximum value within a certain first period of time having the first predetermined length, and said reading from said receiving buffer includes controlling the reading rate by raising the reading rate from said predefined initial value, which it has at the beginning of the bit stream, to a normal value within a second period of time having a second predetermined length, the first period of time and the second period of time being essentially equal in length.

5. The method according to claim 1, wherein:

said temporarily adjusting includes temporarily reading the fullness degree of the packets from a normal value to a temporary value that is a minor fraction of said normal value.

6. The method according to claim 1, wherein:

said temporarily adjusting includes conducting said temporarily reducing in regard to packets that carry user information, in response to control information obtained from said packet network.

7. The method according to claim 1, wherein:

said temporarily adjusting includes conducting said temporarily reducing in regard to packets that carry network control information, in response to control information obtained from said receiving end of said connection.

* * * * *